US012671942B2

(12) United States Patent
Tang et al.

(10) Patent No.: US 12,671,942 B2
(45) Date of Patent: Jun. 30, 2026

(54) CONTROL CIRCUIT FOR MUSIC EFFECT CONTROL DEVICE AND SYSTEMS USING SAME

(71) Applicant: SHENZHEN HAOSHAN TECHNOLOGY CO., LTD, Shenzhen (CN)

(72) Inventors: Bo Tang, Shenzhen (CN); Ronghuang Huang, Shenzhen (CN)

(73) Assignee: SHENZHEN HAOSHAN TECHNOLOGY CO., LTD, Shenzhen (CN)

( * ) Notice: Subject to any disclaimer, the term of this patent is extended or adjusted under 35 U.S.C. 154(b) by 233 days.

(21) Appl. No.: 18/504,292

(22) Filed: Nov. 8, 2023

(65) Prior Publication Data

US 2025/0113146 A1 Apr. 3, 2025

(30) Foreign Application Priority Data

Sep. 28, 2023 (CN) ......................... 202311270286.0

(51) Int. Cl.
*H04R 5/04* (2006.01)
*G10H 1/00* (2006.01)

(52) U.S. Cl.
CPC ............. *H04R 5/04* (2013.01); *G10H 1/0025* (2013.01)

(58) Field of Classification Search
CPC ........ H04R 5/04; G10H 1/0025; G06F 3/162; G06F 3/165
See application file for complete search history.

(56) References Cited

U.S. PATENT DOCUMENTS 8,823,714 B1 * 9/2014 Thielvoldt ............. F24B 1/191 704/200

FOREIGN PATENT DOCUMENTS

CN 103916757 A * 7/2014

* cited by examiner

*Primary Examiner* — Carolyn R Edwards
*Assistant Examiner* — Dylan Maguire Neece
(74) *Attorney, Agent, or Firm* — HOWARD M COHN and Associates, LLC

(57) ABSTRACT

Provided are a control circuit for a music effect control device and systems using the same. The control circuit comprises multiple audio input interfaces and can be connected to audio devices in different forms to acquire audio information, the acquired audio information is converted into digital signals by a processing chip U1 to control a control device, and the control device can control an output from an energy device to an effect device to indirectly change the power of the effect device, so the effect produced by the effect device can change correspondingly with the rhythm of an audio, thus presenting various music effects.

6 Claims, 7 Drawing Sheets

CONTROL CIRCUIT FOR MUSIC EFFECT CONTROL DEVICE AND SYSTEMS USING SAME

BACKGROUND OF THE INVENTION

1. Technical Field

The invention relates to the technical field of audio data, in particular to a control circuit for a music effect control device and systems using the same.

2. Description of Related Art

At present, some large special facilities (such as water spraying facilities, flame spraying facilities and lighting facilities) are often used in various performance places such as stages, show fields, theaters and outdoor entertainment to be fused with performances. For example, a special effect (such as a water spraying effect, a flame spraying effect or a lighting effect) of a special device is enabled when music is played to provide richer visual and aural experience for audience.

However, in order to start a drive device of these special facilities by music in a performance to enable the special facilities to work in concert with the music to create atmospheric effect experience, relevant professionals need to carry out device setting, music editing and software programming on the drive device of the special facilities in advance according to the rhythm and features of the music. However, once the music is changed or replaced with other different music, relevant professionals have to carry out again device setting, music editing and software programming on the drive device of the special facilities according to the rhythm and features of new music. Therefore, such an implementation solution still needs to be improved, and particularly for common customers, they cannot enjoy such special experience without the assistance of relevant professionals.

BRIEF SUMMARY OF THE INVENTION

The invention discloses a control circuit for a music effect control device and systems using the same to solve the technical problems, mentioned in the description of related art, that in the prior art, music editing and software programming need to be carried out on the drive device manually to adapt to different music, which has an excessively high requirement for the debugging ability of users, and the fitness, flexibility and diversity of music effects obtained after debugging and music are low.

To solve the abovementioned technical problems, the following technical solution is provided:

A control circuit for a music effect control device is applied to a system formed by multiple groups of audio control devices and comprises an audio input module, a main control module, a control module and a power supply module, wherein the audio input module, the control module and the power supply module are all electrically connected to the main control module;

the audio input module is configured to acquire audio signals and transmit the acquired audio signals to the main control module;

the main control module is configured to convert the acquired audio signals into digital signals and transmit the digital signals to the control module;

the control module is configured to receive the digital signals transmitted from the main control module, generate corresponding control signals according to the digital signals and send the control signals to a control device, and the control device changes an output of energy supplied by an energy device to an effect device according to the control signals to indirectly control operating power of the effect device to realize different display effects of the effect device; and the power supply module is configured to supply power to the main control module.

Preferably, the audio input module comprises a USB input interface, a fiber input interface, an analog audio input interface, a microphone input interface, a coaxial input interface and a Bluetooth receiving module, all the interfaces and the Bluetooth receiving module are electrically connected to the main control module and configured to acquire the audio signals in different formats and transmit the audio signals to the main control module, and the main control module generates the corresponding PWM digital signals according to the acquired audio signals.

Preferably, the main control module comprises an audio DSP+MCU chip, a wireless output module and an audio output interface, the wireless output module and the audio output interface are both electrically connected to the audio DSP+MCU chip, the audio input module sends the audio signals to the audio DSP+MCU chip, and an algorithm in the audio DSP+MCU chip generates the corresponding PWM digital signals according to the acquired audio signals and sends the PWM digital signals to the control module; and the audio DSP+MCU chip synchronously sends the acquired audio signals to the wireless output module and the audio output interface.

Preferably, the control module comprises multiple control sub-circuits respectively connected to different control devices, a field effect transistor and a 2PIN interface are arranged in each of the control sub-circuits, a gate of the field effect transistor is connected to the main control module, an internal resistance of the field effect transistor is controlled according to the PWM digital signals from the main control module to control internal operating current of the field effect transistor, a drain of the field effect transistor is connected to the 2PIN interface, and the control device is connected to the 2PIN interface.

Preferably, each of the control sub-circuits is provided with a protection branch circuit, which is formed by a protection diode and a high-frequency absorption capacitor, the protection diode and the high-frequency absorption capacitor are connected in parallel with the 2PIN interface, and a positive pole of the protection diode is connected to the drain of the field effect transistor to eliminate counter self-induced electromotive force and high-frequency pulses generated when the control device is short-circuited suddenly.

Preferably, the main control module further comprises a key functional circuit formed by a voltage dividing resistor and a key switch which are connected in series, multiple key functional circuits are connected in parallel to form a key functional circuit group, and the voltage dividing resistors in the key functional circuits have different resistances; the audio DSP+MCU chip is connected to one end of the key functional circuit and sends a current signal to the key functional circuit group, then the current signal returns to the audio DSP+MCU chip, and the other end of the key functional circuit is grounded; and when one key switch in the key functional circuit group is pressed to turn on the circuit, the voltage dividing resistors will take away part of voltage and lead to a change of a feedback signal fed back to the audio DSP+MCU chip, and the audio DSP+MCU chip changes a control mode of a display control circuit according to different feedback signals.

Preferably, the main control module further comprises a display circuit formed by multiple light-emitting diodes which are connected in parallel, each of the multiple light-emitting diodes has an end connected to a current input terminal of a control circuit, as well as an end grounded, the light-emitting diodes are different in color, and when the audio DSP+MCU chip turns on one control sub-circuit, the light-emitting diode in one color will be turned on.

A music effect control system comprises multiple effect groups each formed by an energy device, an audio control device, a control device and an effect device, wherein the energy device is connected to the effect device through the control device, the audio control device is electrically connected to the control device, the energy device is configured to supply energy to the effect device, the audio control device is configured to acquire audio signals and send corresponding control signals to the control device according to the acquired audio signals, and the control device is configured to change an output of energy supplied by the energy device to the effect device.

Alternatively, a music effect control system comprises multiple effect groups each formed by an energy device and an effect device, wherein the energy device is connected to the effect device and configured to supply energy when the effect device operates.

Preferably, an effect generator, a control device and an audio control device are arranged in the effect device, the energy device is connected to the effect generator through the control device, the audio control device is electrically connected to the control device and configured to acquire audio signals and send corresponding control signals to the control device according to the acquired audio signals, and the control device is configured to change an output of energy supplied by the energy device to the effect generator to indirectly change operating power of the effect generator to generate multiple music effects.

The invention has the following beneficial effects:

The invention provides a control circuit for a music effect control device, comprising an audio input module, a main control module, a control module and a power supply module, wherein the power supply module supplies power to the main control module, the audio input module acquires audio signals from the outside and transmits the acquired audio signals to the main control module, and the main control module then generates corresponding PWM digital signals according to the audio signals and transmits the PWM digital signals to the control module to perform corresponding control. The corresponding PWM digital signals are generated according to the audio signals for circuit control, thus greatly improving the control flexibility and diversifying the control effect.

The invention provides a music effect control system, comprising multiple effect groups each formed by an energy device, wherein an audio control device, the control device and the effect device are arranged separately, and users can increase or change the type of effect groups connected to an audio control device according to their preferences, thus improving the setting flexibility of the audio control device.

The invention provides a music effect control system, comprising multiple effect groups each formed by an energy device and an effect device, and an audio control device, a control device and an effect generator are arranged in the effect device. Because the audio control device and the control device are arranged in the effect device, the space occupied by each effect group and the wiring difficulty are greatly reduced, and the music effect control system is more suitable for private courtyards.

DETAILED DESCRIPTION OF THE INVENTION

Figure 1:
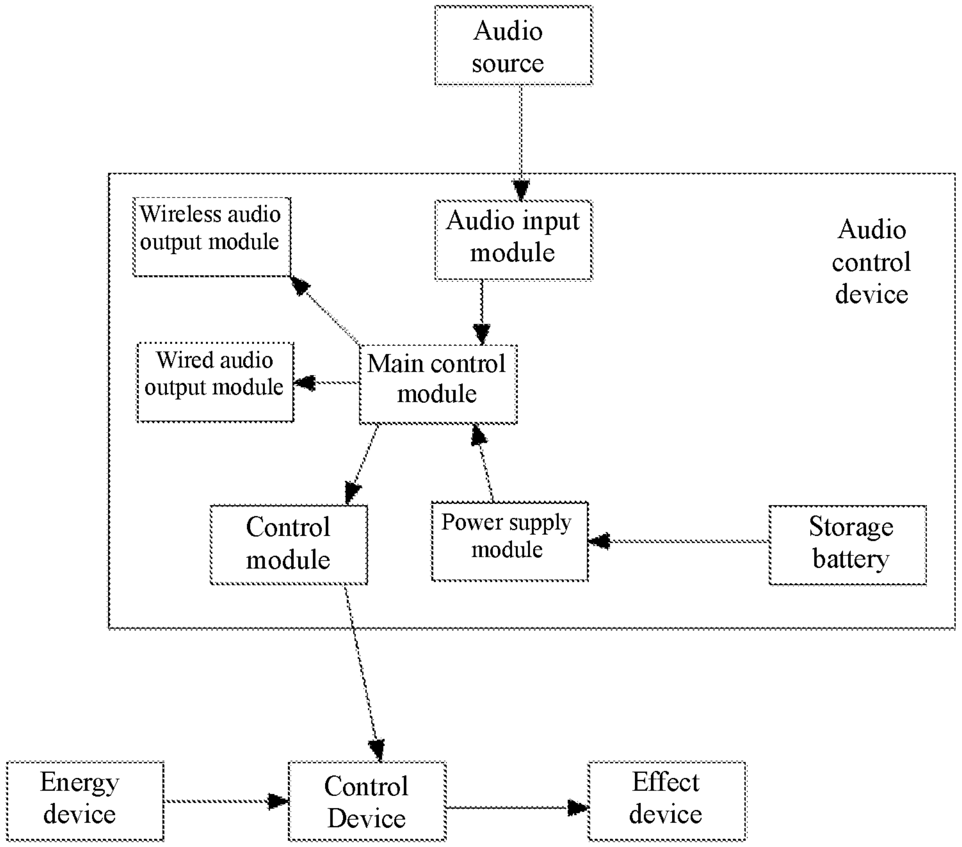
FIG. 1 is a first block diagram of a music effect control system according to the invention.

To gain a better understanding of the purposes, technical solutions and advantages of the embodiments of the invention, the technical solutions of the embodiments of the invention will be clearly and completely described below in conjunction with the drawings of the embodiments. Obviously, the embodiments in the following description are merely illustrative ones, and are not all possible ones. Generally, the components of the embodiments of the invention described and illustrated in the drawings may be arranged and designed according to different configurations.

The following detailed description of the embodiments of the invention provided in the drawings is not intended to limit the protection scope of the invention, and is only for the purpose of explaining selected embodiments of the invention. All other embodiments obtained by those ordinarily skilled in the art based on the following ones without creative labor should also fall within the protection scope of the invention.

Figure 2:
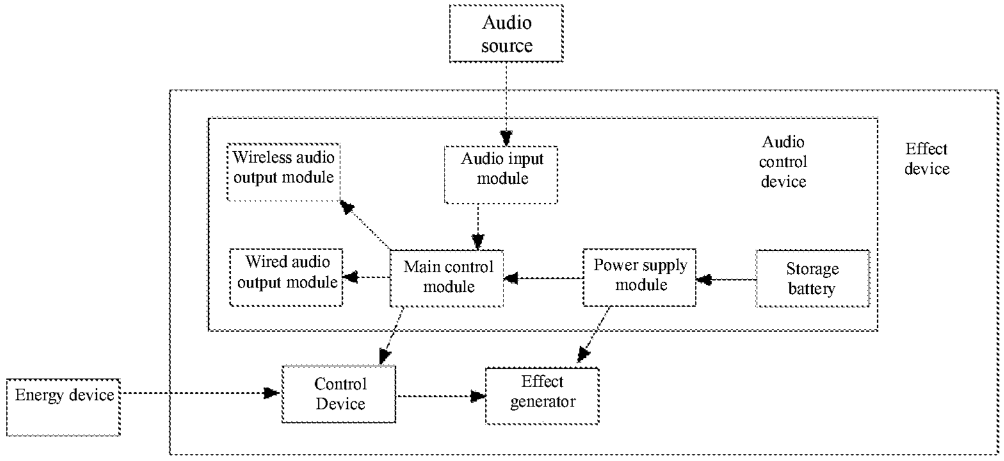
FIG. 2 is a second block diagram of the music effect control system according to the invention.

To solve the problems that, in the prior art, music editing and software programming need to be carried out on the drive device manually to adapt to different music, which has an excessively high requirement for the debugging ability of users, and the fitness, flexibility and diversity of music effects obtained after debugging and music are low, the application provides two systems: a music effect control system as illustrated in FIG. 1, and another music effect control system as illustrated in FIG. 2.

Referring to FIG. 1, the invention provides a music effect control system, comprising multiple effect groups each formed by an energy device, an audio control device, a control device and an effect device, wherein the energy device is connected to the effect device through the control device, the audio control device is electrically connected to the control device, the energy device is configured to supply energy to the effect device, the audio control device is configured to acquire audio signals and send corresponding control signals to the control device according to the acquired audio signals, and the control device is configured to change an output of the energy supplied by the energy device to the effect device.

Referring to FIG. 2, alternatively, the invention further provides a music effect control system, comprising multiple effect groups each formed by an energy device and an effect device, wherein the energy device is connected to the effect device and is configured to supply energy when the effect device operates.

Specifically, an effect generator, a control device and an audio control device are arranged in the effect device, the energy device is connected to the effect generator through the control device, the audio control device is electrically connected to the control device and configured to acquire audio signals and send corresponding control signals to the control device according to the acquired audio signals, and the control device is configured to change an output of energy supplied by the energy device to the effect generator to indirectly change operating power of the effect generator to generate multiple music effects. In addition, by arranging the audio control device and the control device in the effect device, the space occupied by each effect group is further reduced.

Figure 3:
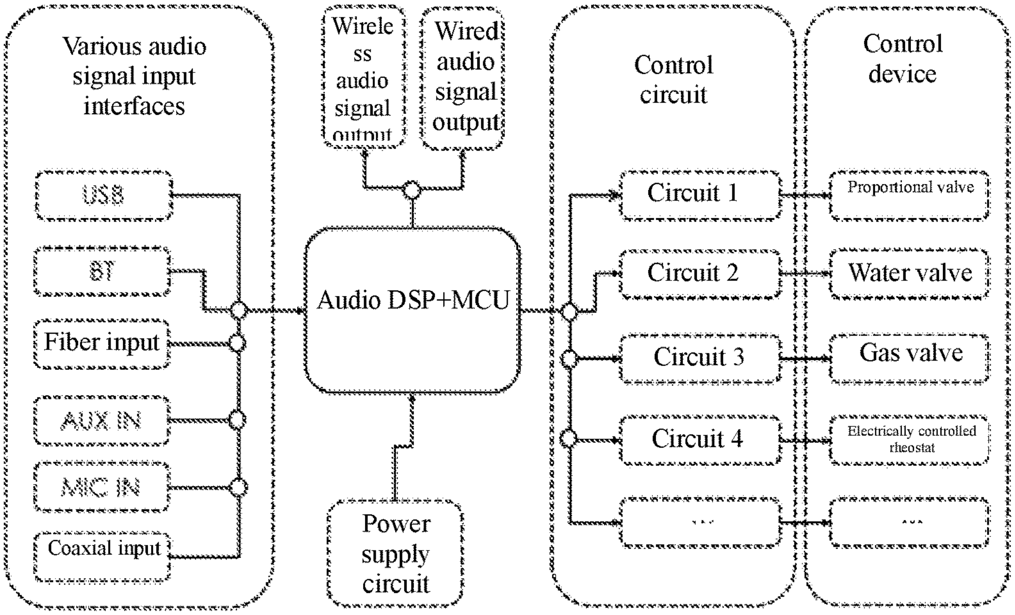
FIG. 3 is an internal schematic block diagram of an audio control device according to the invention.

Referring to FIG. 3, specifically, the music effect control system comprises four effect groups: a flame effect group using a gas cylinder as the energy device, a proportional valve as the control device and a burner as the effect device; a fountain effect group using a water pump as the energy device, a water valve as the control device and a fountain as the effect device; a lighting effect group using a power supply as the energy device, an electrically controlled rheostat as the control device, and an LED lamp group as the effect device; and a gas effect group using a compressed gas tank as the energy device, a gas valve as the control device and a gas vent as the effect device. Multiple effect groups work together to improve the diversity of the music effect control system.

Specifically, one audio control device may control multiple types of effect groups to form a small music effect control system with a single audio control device; or, multiple effect groups of the same type are controlled by one audio control device, effect groups of different types are controlled by multiple audio control devices respectively, and the multiple audio control devices are connected wirelessly, such that the scale of the music effect control system is expanded.

Referring to FIG. 3, the invention provides a digital audio control circuit, comprising an audio input module, a main control module, a control module and a power supply module, wherein the audio input module, the control module and the power supply module are all electrically connected to the main control module;

The audio input module is configured to acquire audio signals and transmit the acquired audio signals to the main control module;

The main control module is configured to convert the acquired audio signals into digital signals according to an algorithm and transmit the digital signals to the control module;

The control module is configured to receive the digital signals transmitted from the main control module, generate corresponding control signals according to the digital signals, and send the control signals to a control device, and the control device changes an output of energy supplied by an energy device to an effect device to indirectly control operating power of the effect device to realize different display effects of the effect device; and The power supply module is configured to supply power to the main control module.

Specifically, the audio input module comprises a USB input interface, a fiber input interface, an analog audio input interface, a microphone input interface, a coaxial input interface and a Bluetooth receiving module, all the interfaces and the Bluetooth receiving module are electrically connected to the main control module and configured to acquire the audio signals in different formats and transmit the acquired audio signals to the main control module, and the main control module generates the corresponding PWM digital signals according to the acquired audio signals.

Figure 4:
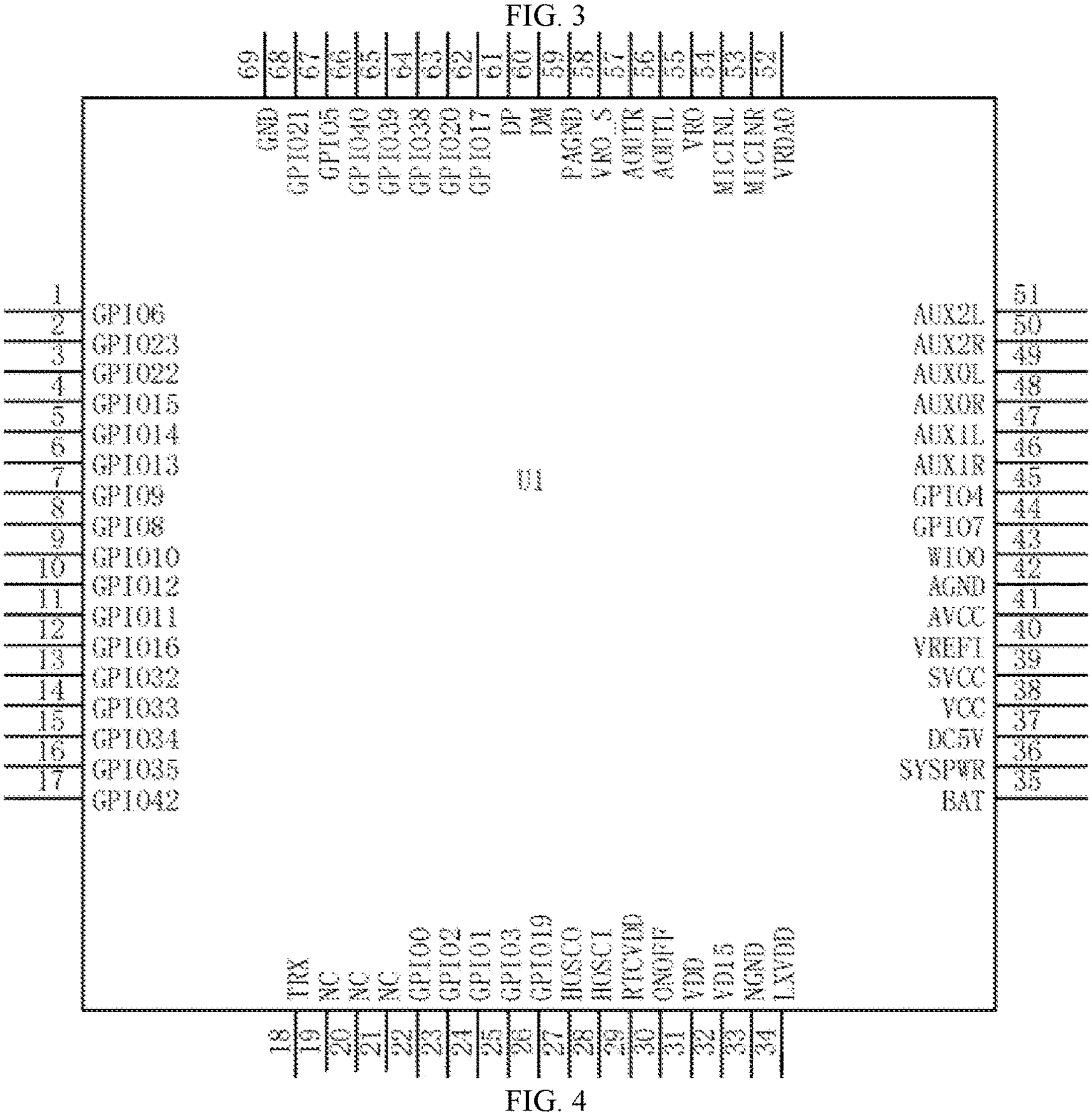
FIG. 4 is a schematic diagram of an audio DSP+MCU chip according to the invention.

Specifically, referring to FIG. 4, the main control module comprises an audio DSP+MCU chip (U1), a wireless output module and an audio output interface, wherein the model of the audio DSP+MCU chip (U1) is ATS2835P, or ATS2853P as a standby; peripheral circuits of ports 1-69 of the audio DSP+MCU chip (U1) are designed according to the specification of the chip, which can be implemented by those ordinarily skilled in the art, and for the sake of a fluent description, the peripheral circuits and connection thereof are omitted in this specification; the wireless output module and the audio output interface are both electrically connected to the audio DSP+MCU chip (U1), the audio input module sends the audio signals to the audio DSP+MCU chip (U1), and an algorithm in the audio DSP+MCU chip (U1) generates the corresponding PWM digital signals according to the acquired audio signals and sends the PWM digital signals to the control module; and, the audio DSP+MCU chip (U1) synchronously sends the acquired audio signals to the wireless output module and the audio output interface, such that users can establish a connection with the main control module by means of a mobile phone, an earphone, a PC, a speaker or other devices to share an audio source.

Figure 5:
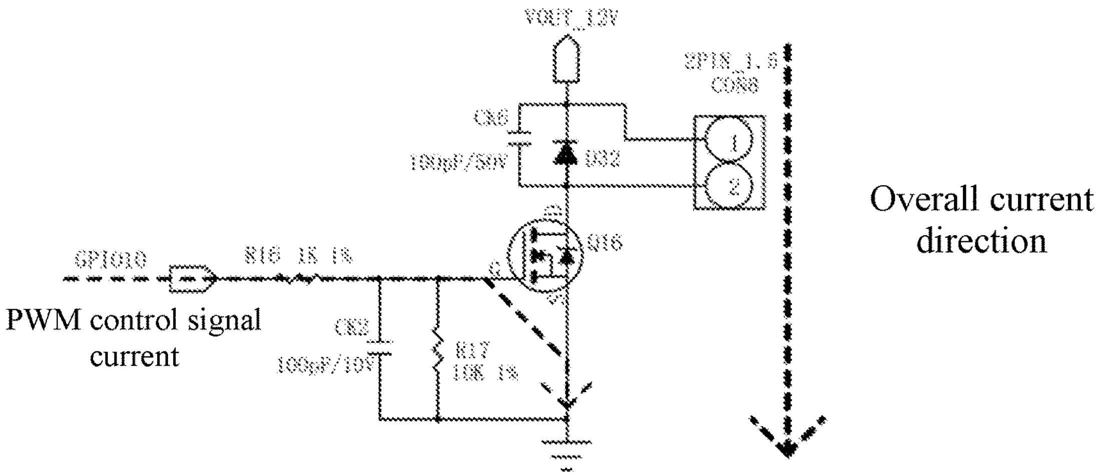
FIG. 5 is a circuit diagram of a control circuit according to the invention.

Specifically, referring to FIG. 5, the control module comprises multiple control sub-circuits respectively connected to different control devices. A field effect transistor (Q16) and a 2PIN interface (CON8) are arranged in each control sub-circuit, wherein a gate of the field effect transistor (Q16) is connected to GPI010-GPI013 ports of the audio DSP+MCU chip (U1), the internal resistance of the field effect transistor (Q16) is controlled according to the PWM digital signal from the main control module to control internal operating current of the field effect transistor (Q16), a drain of the field effect transistor (Q16) is connected to one end of the 2PIN interface (CON8), the other end of the 2PIN interface (CON8) is connected to the power supply module, the control device is connected to the 2PIN interface (CON8), and first and second voltage dividing resistors (R16 and R17) and a filter capacitor (CK2) are also arranged in the control sub-circuit and are connected in series with a source and the gate of the field effect transistor (Q16) to maintain the flexibility of the circuit.

Specifically, each control sub-circuit is provided with a protection branch circuit formed by a protection diode (D32) and a high-frequency absorption capacitor, wherein the protection diode and the high-frequency absorption capacitor are connected in parallel with the 2PIN interface, and a positive pole of the protection diode is connected to the drain of the field effect transistor to eliminate counter self-induced electromotive force and high-frequency pulses generated when the control device is short-circuited suddenly, thus protecting components of the control sub-circuit and the main control module connected with the control sub-circuit.

Figure 6:
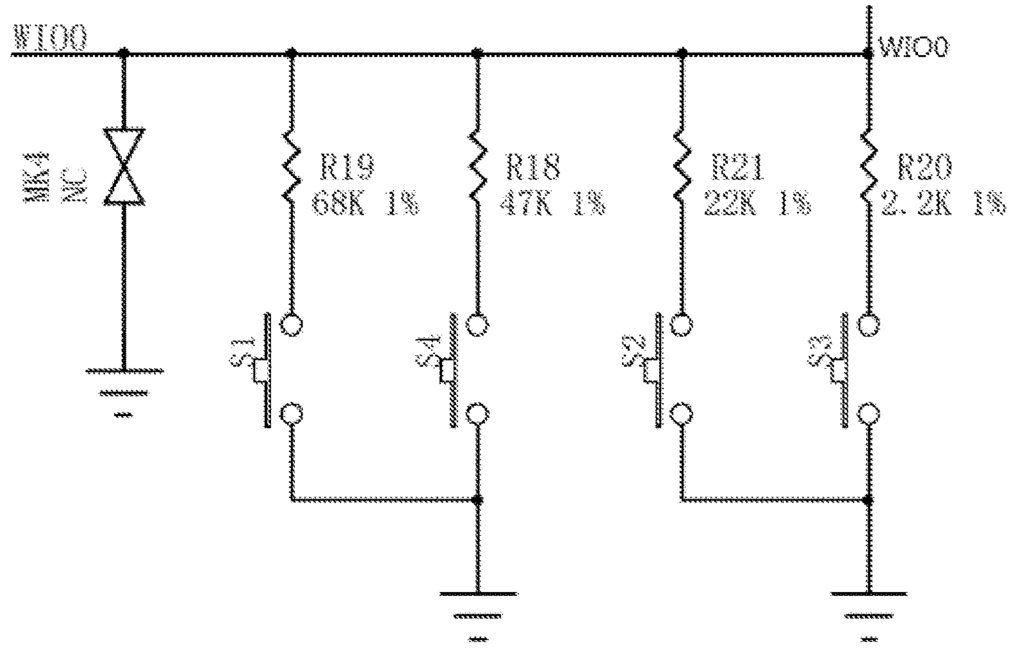
FIG. 6 is a circuit diagram of a key functional circuit according to the invention.

Specifically, referring to FIG. 6, the main control module further comprises a key functional circuit formed by a voltage dividing resistor and a key switch which are correspondingly connected in series, multiple key functional circuits are connected in parallel to form a key functional circuit group, and the voltage dividing resistors have different resistances. First, the audio DSP+MCU chip (U1) is connected to one end of the key functional circuit group via a WIO0 port and sends an electric signal to the key functional circuit group, then the electric signal returns to the WIO0 port of the audio DSP+MCU chip (U1), and the other end of the key functional circuit group is grounded. When one key switch of the key functional circuit group is pressed to turn on the circuit, the voltage dividing resistors will take away part of voltage and lead to a change of a feedback signal fed back to the audio DSP+MCU chip (U1), and the audio DSP+MCU chip (U1) changes a control mode of a display control circuit according to different feedback signals.

Figure 7:
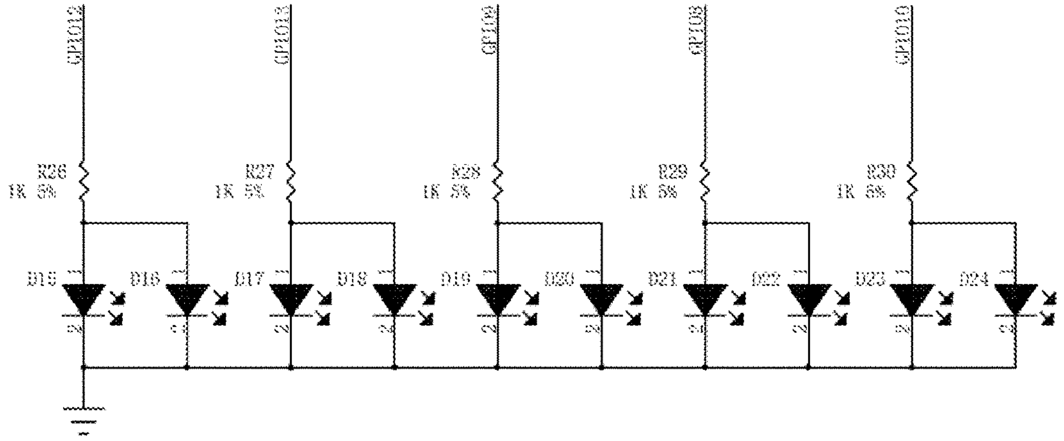
FIG. 7 is a circuit diagram of a display circuit according to the invention.

Specifically, referring to FIG. 7, the main control module further comprises a display circuit formed by multiple light-emitting diodes which are connected in parallel, one ends of the multiple light-emitting diodes are connected to GPI08, GPI09, GPI010, GPI012 and GPI013 ports of the audio DSP+MCU chip respectively, and the other ends of the multiple light-emitting diodes are grounded; and the light-emitting diodes are in different color, and when the audio DSP+MCU chip (U1) turns on one control sub-circuit, the light-emitting diode in one color will be turned on.

Figure 8:
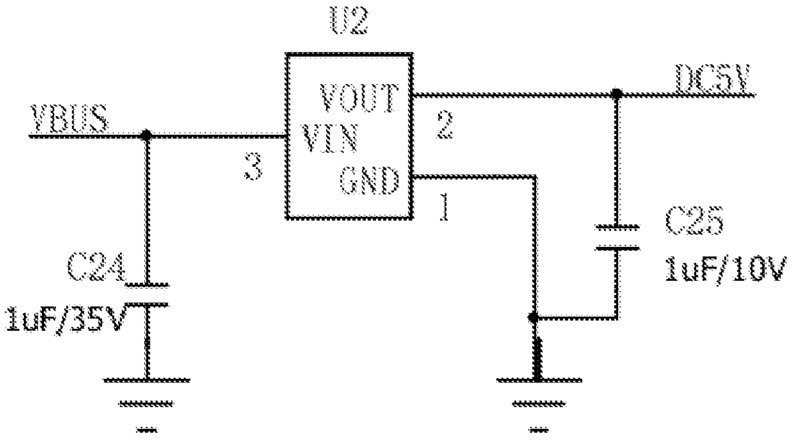
FIG. 8 is a circuit diagram of a charge wake-up circuit according to the invention.

Specifically, referring to FIG. 8, the main control module further comprises a charge wake-up circuit formed by a linear voltage regulator (U2) and first and second capacitors (C24 and C25), wherein an input terminal of the linear voltage regulator (U2) is connected to the power supply module, an output terminal of the linear voltage regulator (U2) is connected to a DC5V port of the audio DSP+MCU chip (U1), one end of the first capacitor (C24) is connected to the input terminal of the linear voltage regulator (U2), the other end of the first capacitor (C24) is grounded, one end of the second capacitor (C25) is connected to the output terminal, and the other end of the second capacitor (C25) is grounded. When the power supply module is accessed to an external power supply, the output terminal of the linear voltage regulator (U2) sends a DC 5V electric signal to the audio DSP+MCU chip (U1), such that the audio DSP+MCU chip (U1) can be detected and started quickly to enter the operating state.

Figure 9:
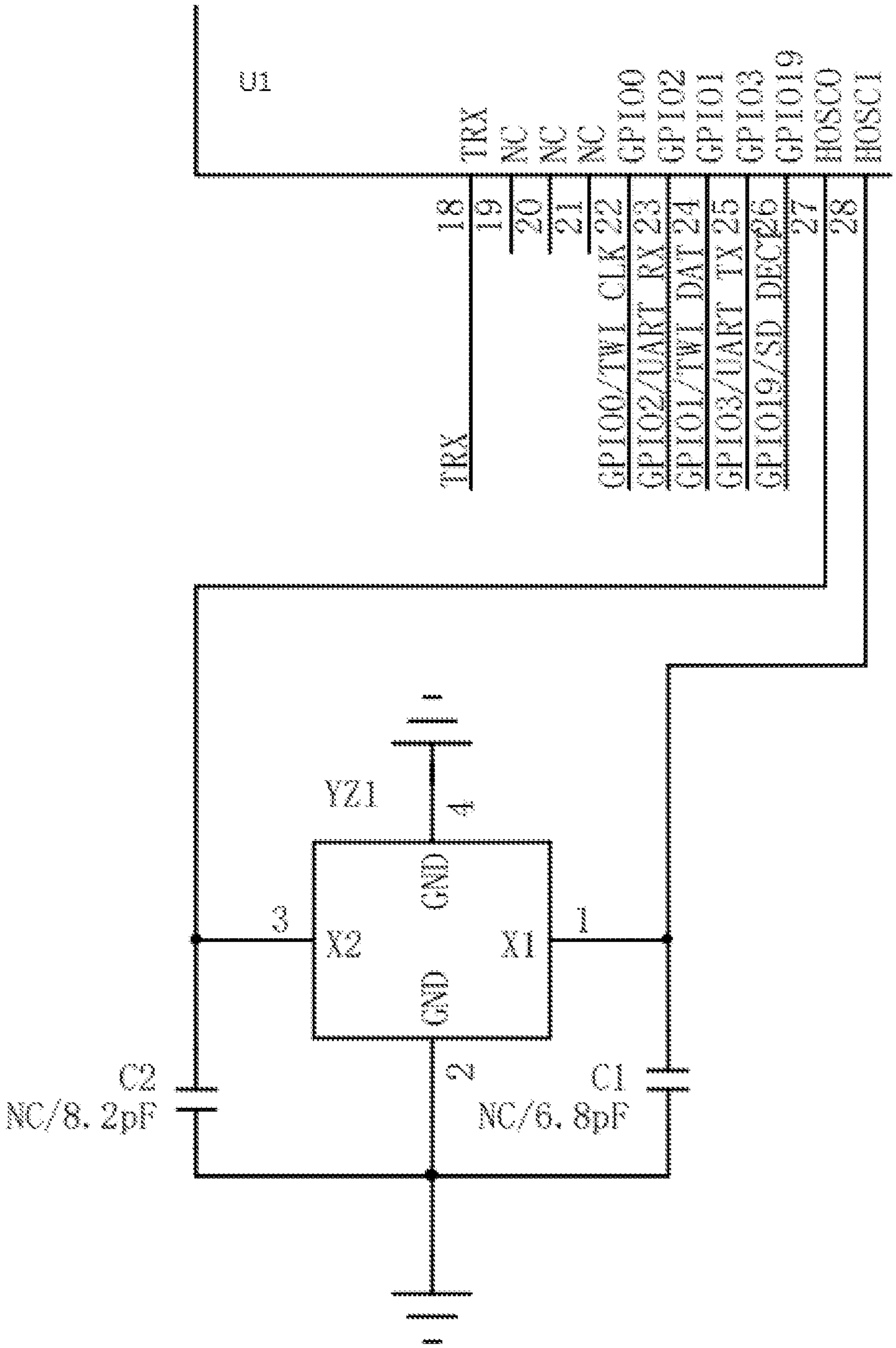
FIG. 9 is a circuit diagram of a clock circuit according to the invention.

Specifically, referring to FIG. 9, the main control module further comprises a clock circuit formed by a crystal oscillator (YZ1) and third and fourth capacitors (C1 and C2), wherein the crystal oscillator (YZ1) and the third and fourth capacitors (C1 and C2) are packaged by 4-pin SMD and electrically connected to HOSCO and HOSCI ports of the audio DSP+MCU chip (U1) to provide an internal reference operating frequency for the audio DSP+MCU chip (U1).

Figure 10:
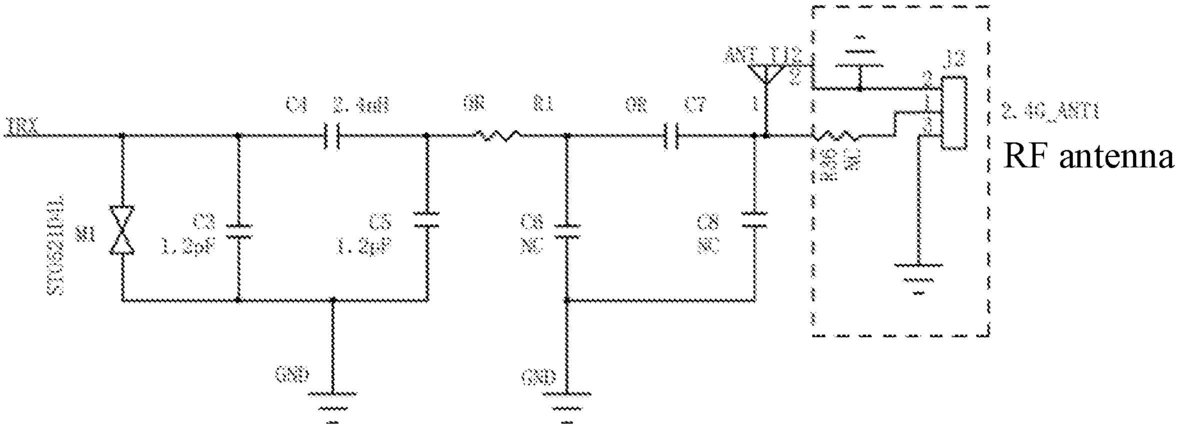
FIG. 10 is a circuit diagram of an RF antenna circuit according to the invention.

Specifically, referring to FIG. 10, the main control module further comprises an RF antenna circuit formed by first, second, third, fourth, fifth and sixth filter capacitors (C3, C4, C5, C6, C7 and C8), first and second regulating resistors (R1 and R36), an electrostatic diode (M1) and a wireless transmitter (J2), wherein an RF signal is sent out via a TRX port of the audio DSP+MCU chip (U1), and transmitted to the wireless transmitter (J2) after voltage division by the first and second regulating resistors (R1 and R36) and filtering by the first, second, third, fourth, fifth and sixth filter capacitors (C3, C4, C5, C6, C7 and C8), and is sent by the wireless transmitter (J2) to other audio control devices, mobile terminal devices such as mobile phones and tablet computers, or PC clients.

Figure 11:
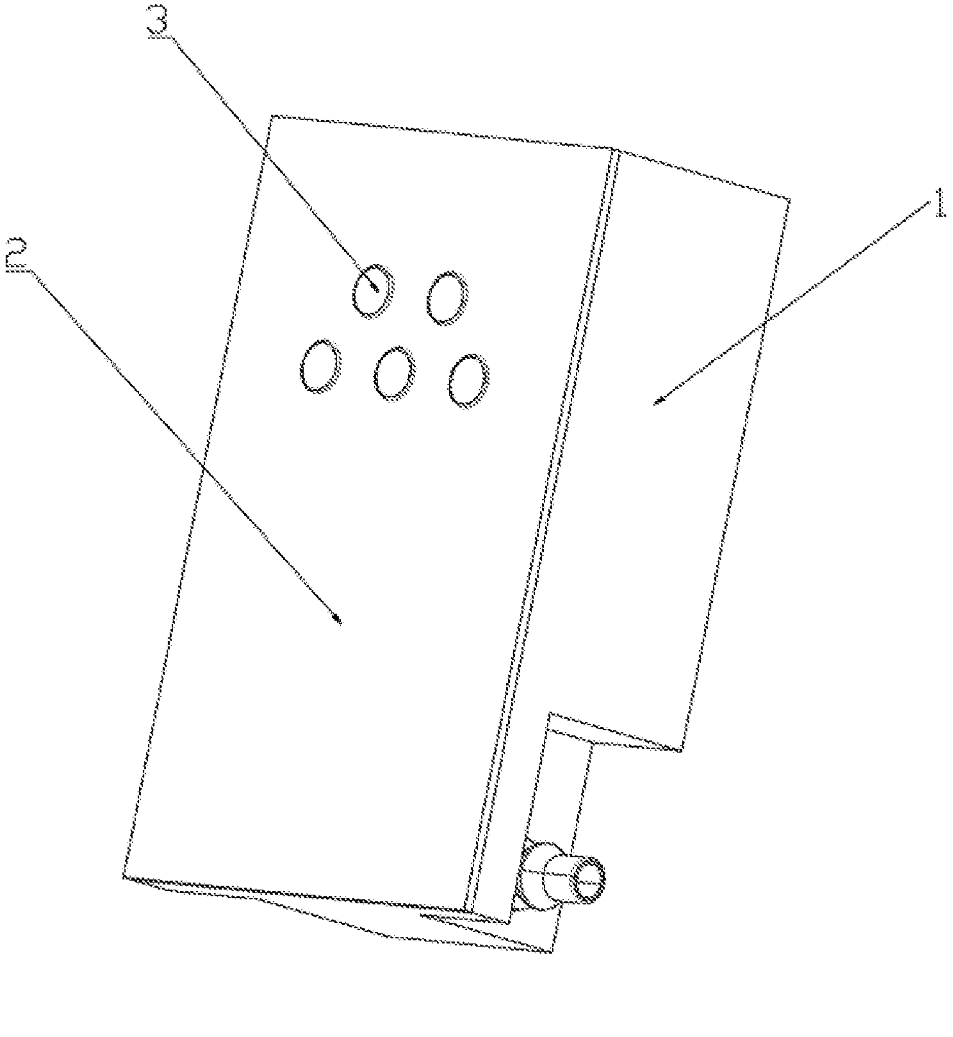
FIG. 11 is an overall external view of the audio control device according to the invention.
Figure 12:
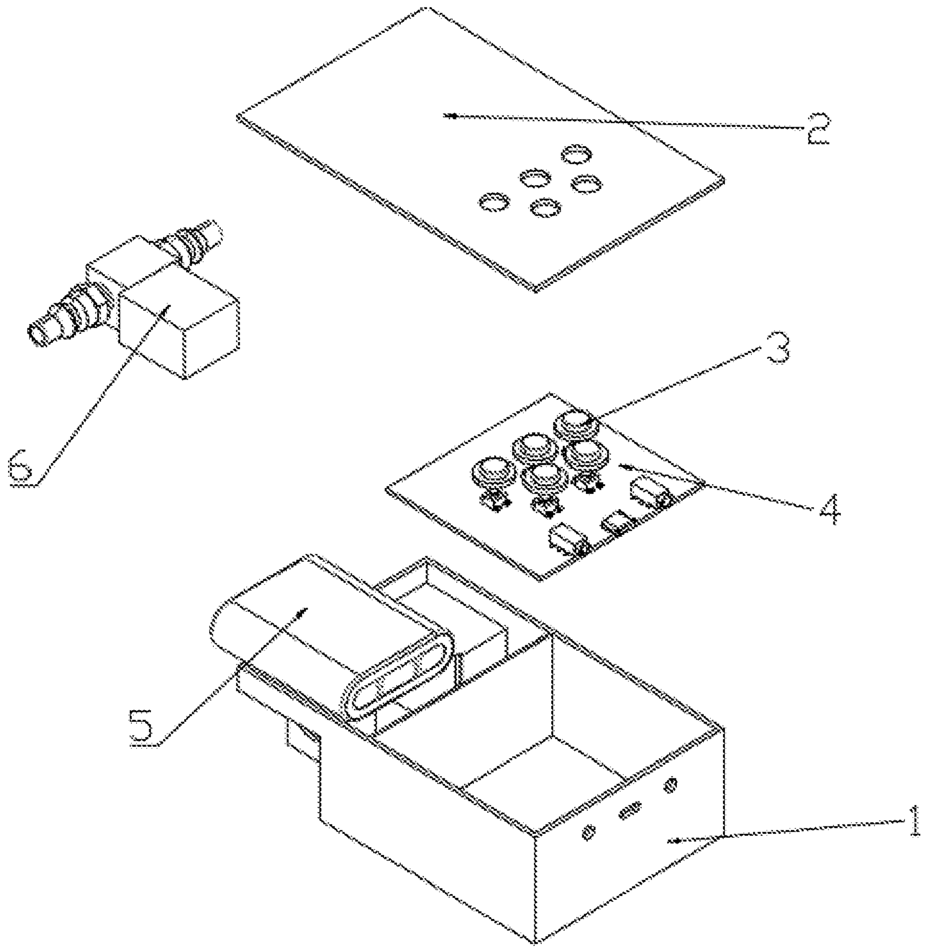
FIG. 12 is an exploded view of the audio control device according to the invention.

Specifically, referring to FIG. 11 and FIG. 12, the invention further provides an audio control device, comprising a housing 1, a main control board 4, key switches 3, a control device 6, a storage battery 5 and a cover plate 2, wherein the cover plate 2 covers the housing 1 to form a receiving space for receiving the main control board 4, the storage battery 5 and the control device 6, through holes allowing the key switches 3 to stretch out are formed in the cover plate, an audio input interface, an audio output interface and a power interface to be connected to external devices are formed in one side of the housing 1, the storage battery 5 is electrically connected to the main control board 4, the main control board 4 is electrically connected to the control device 6, the storage battery 5 supplies power to the device, an audio signal is input to the main control board 4 via the audio input interface, and the main control board 4 generates a corresponding PWM digital signal according to the frequency of the audio signal to control the control device 6 to indirectly control the music effect generated by an effect device connected with the control device 6, such that the music effect can be changed correspondingly with the change of audios.

The audio control device may be arranged in a speaker, and an audio cable of the speaker is connected to the audio output interface to obtain the audio signal to play music synchronously. In this application scenario, the control device and the audio control device are separated and electrically connected merely by means of a wire. The audio control device may also be arranged in an effect device, and under the control of the control device in the audio control device, the effect device can change corresponding music effects.

The embodiments disclosed above are merely several specific ones of the invention, and the invention is not limited to the above embodiments. All transformations that can be obtained by those skilled in the art should also fall within the protection scope of the invention.

What is claimed is:

1. A control circuit for a music effect control device, being applied to a system formed by multiple groups of audio control devices, the system comprising an energy device, a control device and an effect device, and the energy device being connected to the effect device through the control device and configured to supply energy to the effect device, wherein the control circuit comprises an audio input module, a main control module, a control module and a power supply; wherein the audio input module, the control module and the power supply are all electrically connected to the main control module;

the audio input module is configured to acquire audio signals and transmit the acquired audio signals to the main control module;

the main control module is configured to convert the acquired audio signals into PWM digital signals and transmit the digital signals to the control module;

the control module is configured to receive the digital signals transmitted from the main control module, generate corresponding control signals according to the PWM digital signals and send the control signals to the control device, and the control device changes an output of the energy supplied by the energy device to the effect device according to the control signals to indirectly control operating power of the effect device to realize different display effects of the effect device; and the power supply is configured to supply power to the main control module;

wherein the main control module comprises an audio DSP+MCU chip, a wireless output module, and an audio output interface; wherein the wireless output module and the audio output interface are both electrically connected to the audio DSP+MCU chip, wherein the audio input module is configured to send the audio signals to the audio DSP+MCU chip, and wherein an algorithm in the audio DSP+MCU chip is configured to generate the corresponding PWM digital signals based on the acquired audio signals and send the PWM digital signals to the control module; and wherein the audio DSP+MCU chip is configured to synchronously send the acquired audio signals to the wireless output module and the audio output interface;

wherein the control module comprises a plurality of control sub-circuits respectively connected to different control devices, wherein a field effect transistor and a 2PIN interface are arranged in each of the plurality of control sub-circuits, wherein a gate of the field effect transistor is connected to the main control module, wherein an internal resistance of the field effect transistor is operative to be controlled according to the PWM digital signals from the main control module to control an internal operating current of the field effect transistor, wherein a drain of the field effect transistor is connected to one end of the 2PIN interface, the other end of the 2PIN interface is connected to a 12V power interface of the main control module, and wherein the control device is connected to the 2PIN interface, and wherein a source of the field effect transistor is grounded;

wherein each of the plurality of control sub-circuits is provided with a protection branch circuit, comprising a protection diode and a high-frequency absorption capacitor and configured to eliminate a counter self-induced electromotive force and high-frequency pulses generated when the control device is short-circuited suddenly, wherein the protection diode and the high-frequency absorption capacitor are connected in parallel with the 2PIN interface, and wherein a positive pole of the protection diode is connected to the drain of the field effect transistor;

wherein the audio input module comprises at least one selected from the group consisting of a USB input interface, a fiber input interface, an analog audio input interface, a microphone input interface, a coaxial input interface, and a short-range wireless communication receiver, wherein all the interfaces and the short-range wireless communication receiver are electrically connected to the main control module and configured to acquire the audio signals in different formats and transmit the audio signals to the main control module, and wherein the main control module is configured to generate the corresponding PWM digital signals according to the acquired audio signals.

2. The control circuit for a music effect control device according to claim 1, wherein the main control module further comprises a key functional circuit formed by a voltage dividing resistor and a key switch which are connected in series, multiple said key functional circuits are connected in parallel to form a key functional circuit group, and the voltage dividing resistors in the key functional circuits have different resistances; the audio DSP+MCU chip is connected to one end of the key functional circuit and sends a current signal to the key functional circuit group, then the current signal returns to the audio DSP+MCU chip, and the other end of the key functional circuit is grounded; and when one said key switch in the key functional circuit group is pressed to turn on the circuit, the voltage dividing resistors will take away part of voltage and lead to a change of a feedback signal fed back to the audio DSP+MCU chip, and the audio DSP+MCU chip changes a control mode of a display control circuit according to different feedback signals.

3. The control circuit for a music effect control device according to claim 1, wherein the main control module further comprises a display circuit formed by multiple light-emitting diodes which are connected in parallel, each of the multiple light-emitting diodes has an end connected to a current input terminal of a control circuit, as well as an end grounded, the light-emitting diodes are different in color, and when the audio DSP+MCU chip turns on one said control sub-circuit, the light-emitting diode in one color will be turned on.

4. A music effect control system, using the control circuit for a music effect control device according to claim 1, wherein the music effect control system comprises multiple effect groups each formed by an energy device, an audio control device, a control device and an effect device, the energy device is connected to the effect device through the control device, the audio control device is electrically connected to the control device, the energy device is configured to supply energy to the effect device, the audio control device is configured to acquire audio signals and send corresponding control signals to the control device according to the acquired audio signals, and the control device is configured to change an output of the energy supplied by the energy device to the effect device.

5. A music effect control system, using the control circuit for a music effect control device according to claim 1, wherein the music effect control system comprises multiple effect groups each formed by an energy device and an effect device, and the energy device is connected to the effect device and configured to supply energy when the effect device operates.

6. The music effect control system according to claim 5, wherein an effect generator, a control device and an audio control device are arranged in the effect device, the energy device is connected to the effect generator through the control device, the audio control device is electrically connected to the control device and configured to acquire audio signals and send corresponding control signals to the control device according to the acquired audio signals, and the control device is configured to change an output of energy supplied by the energy device to the effect generator to indirectly change operating power of the effect generator to generate multiple music effects.

* * * * *